No Printed Specification Available
9237X
C. J. CONWAY.
CENTRIFUGAL PNEUMATIC STEAM ENGINE.
Patented Nov. 14, 1835.
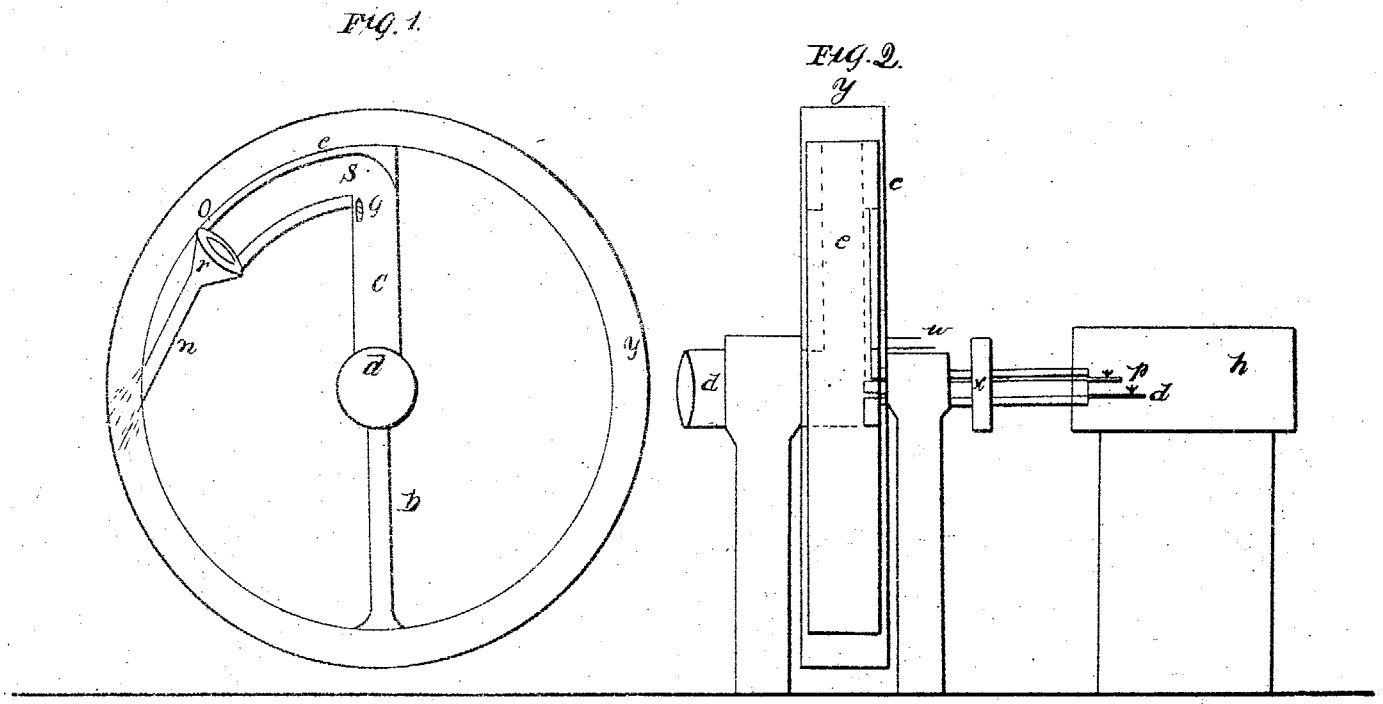

Charles I. Conway of the City, County, and State of N. York.

11-14-1835

Letters Patent.

The schedule referred to in these Letters Patent and making part of the same containing a description in the words of the said Charles I. Conway himself of his Improvement in the Centrifugal Pneumatic Steam Engine.

To all to whom these presents shall come,

Be it known that I Charles I. Conway, of the City and County of New York, and State of New York, have invented a new and useful Machine, and that the following is a full and exact description of the construction and operation of the said Machine as invented by me to wit. Specification of an Invention called the centrifugal Pneumatick Steam Engine.

The moving power or principle of action in this Engine is caloric its objects are, simplicity in action and construction. The application of the caloric obtained from the fuel or combustible matter to the production of an available mechanical force, and the production of Caloric from water, the Caloric so produced to be applied as a part of the moving power, of the Engine. the aforenamed objects are thus attained by this Engine. see fig. 1st in drawing herewith. A metal tube or tubular axle a. is placed horizontally upon supporters properly adjusted to allow it a free rotary motion: This tubular axle is open at one extremity to the atmosphere. A metal tube c. radiates in a perpendicular line from the aforenamed tubular axles the communication from the interior of the axle with that of the tube being preserved.

That extremity of the radiating tube not attached to the axle, communicates with a metallick chamber S. forming the segment of a circle, the centre of which is the axis or true centre of the tubular axle; a metal chamber C. encloses the chamber aforenamed leaving a small space between the two. The inner chamber S. is the furnace, the outer chamber C. is the steam generator, That end of the furnace not attached to the radiating tube, is crossed by metallic tubes the extremities of which communicate with the interior of the steam generator, These tubes are placed very near to each

9237X other and from a grate to prevent the escape of the fuel from the furnace, The end of the steam generator near the grate of the furnace has a small orifice. O. from which the steam from the generator is allowed to escape and enter into another small chamber T. into which the heated air from the furnace also passes and then the two fluids uniting pass in one body into the atmosphere through a tube N. describing a tangent from the circle, of which the furnace is a segment, A strong metal tire and circular sides enclose the radiating tube, the chamber and the escape tube before described forming a close wheel, the only openings to which are the orifice at one end, of the tubular axle, and the mouth of the escape tube which opens through the periphery. A small tube p. fig 2d. communicating with the steam generator passes down by the back of the radiating tube before described, enters the solid part of the axle, passes through it and communicates with the water reservoir, R. another small tube .d. communicating with the reservoir also passes through the solid axle, and enters the tubular part, for the purpose of conveying a small quantity of water into the radiating tube thence to pass into the furnace, The Engine is put into action by placing a portion of fuel, in combustion, in the tubular axle, then by giving the wheel rotary motion (in such a direction that the furnace shall follow the radiating tube;) the fuel is propelled by centrifugal impetus along the radiating tube into the furnace. the action continuing the air within the radiating tube is also thrown into the furnace, whence after aiding the combustion, of the fuel, it passes through the tubular grate, and along the escape tube into the atmosphere thus aiding the action of the engine When the action has continued a sufficient time to get the furnace and generator properly heated, the water in the reservoir is allowed to enter the small tube p. in the axle from whence it will be propelled by centrifugal impetus through the tube p, into the steam generator, where being converted into steam, it will rush through the orifice O. at the end of the generator. unite with the heated air in the outer chamber and escape into the atmosphere thus aiding the action of the Engine, The requisite supply of fuel is maintained by throwing it into the tubular axle from which the centrifugal impetus propels it into the furnace, When When a sufficiently rapid combustion is obtained the water is allowed to enter from the reservoir into the small tube d, along the solid part of the axle into the tubular part thence it is propelled by centrifugal impetus into the furnace and becoming decomposed in its passage through the burning fuel, the hydrogen gas which is disengaged combusts and thus increases the moving power of the Engine.

Should the decomposition of the water thus introduced into the furnace not be complete the portion not decomposed will be converted into steam, and issue from the furnace with the heated air, and the gases formed by the combustion; thus aid the action of the Engine.

The supply of water to the steam generator and the furnace can be regulated at pleasure, by the cocks commanding the water passages p. & d, along the axle and which cocks are placed at the extremities of those passages in the reservoir.

The pressure of steam and heated air employed in the Engine, with a given quantity of fuel, will depend on the size of the orifice in the periphery of the wheel through which the expanding fluids issue, the pressure increasing as the orifice decreases and vice versa.

The power of the Engine will be the pressure maintained on a space at the extremity of the radius which is the base of the tangent described by the tube through which the fluid escapes into the atmosphere, equal to the orifice in the periphery, that pressure being multiplied by the velocity of the radius at the point on which the pressure is maintained. for as an equal pressure is maintained by the confined fluids on all sides, and resisted from the extremity of the radiating tube, to the point of the fluids escape through the periphery where the resistance is removed. it becomes obvious that there is a pressure opposite to the point from which the resistance is removed, acting so as to propel the wheel in the direction of its action.

The back pressure of the steam into the furnace, when it escapes from the generator is prevented by the counter pressure of the condensed and heated air, within the furnace. The requisite condensation for this purpose is given to the air by the centrifugal impetus it receives from the velocity of the radiating tube. This impetus propels the air to the extre- -mity

9237X of the tube, when meeting with resistance in its passage through the furnace and escape tube, and fresh volumes continually pressing from the centre it becomes condensed and maintains an equilibrium of pressure, or elastic force with the heated air in the furnace and the steam at the other end. That this condensation can be given to atmospherick air by the means above described, will be obvious upon the following considerations at= mospherick air moving at the rate of two hundred miles per hour: (the max- -imum velocity of wind) possesses an impetus sufficient to tear up trees by the roots and level the strongest buildings; and if air moving at this rate enter any place from which it cannot escape, the outward pressure still continuing it becomes condensed to a considerable degree.

A velocity of two hundred miles an hour, is 17600 feet a minute By the principle of action in this Engine (as has been proved by experiment a velocity of 50.000 feet per minute may be easily obtained, and the im- petus of such a velocity would be sufficient to condense the air at the radiating tube so as to give it an elastick force equal to very high pressure steam. No loss of power is sustained by giving the air a degree of condensation as a full equivalent is obtained in its reexpansion, for the force used to condense it and the additional force it derives from the caloric imbibed in its passage through the furnace is so much available power, over and above the power used in condensing it.

Y. in Fig 1st & 2d. is a fixed case within which, the wheel revolves. This case is for the purpose of receiving the steam, and smoke from the wheel, allowing them the escape from towards the centre of the case, into the pipe W. which conducts them in any required direction. The ashes or residue of the burning fuel is also forced from the furnace by the rush of air into this case.

The arm b Fig. 1st. is intended as a balance to the radiating tube, furnace &c. The velocity of the wheel may be diminished or entirely stopped by a gripe upon the axle. The motion is connected by a strap passing round the drum X, on the axle and may be disconnected from the machinery at a moments notice. q is a valve grating in the radiating tube opening upwards and is to prevent the return of the fuel from the furnace when the engine is stopped. The tubular end of the axle, a. being necessarily large to admit the supply of fuel it works against friction rollers by which means the friction is diminished.

Anthracite or betuminous coal, coke, charcoal or wood may be used as fuel in this Engine, the circumstances under which combustion is maintained decomposing any combustable matter with great rapidity. This rapidity of combustion supercedes the necessity of maintaining a large quantity of fuel in action as from a very small quantity as much heat is given out in a certain time as could be procured from a much larger quantity of fuel, combusting under the usual circumstances. The advantages of this Engine are 1st. The saving of fuel or combustable matter by the application of the air used in promoting the combustion to assist the action of the engine, by which means that portion of the heat which in the usual mode of producing combustion passes off with the smoke, is here rendered an available power. 2nd The saving of other combustable matter from the use of water as a producer of heat 3rd. The simplicity of this Engine, both in construction and action by which the cost is reduced, and from the absence of rubbing parts and reciprocating action power saved.

4th. The safety of this Engine from the desastrous effects of explosion for from the expansive power being generated immediately in contact with its point of escape, an explosion is rendered almost impossible, and even should it occur, its effects would be trifling as in this Engine there is no magazine of expansive power which in the steam Engine often produces such disastrous consequences. 5th The lightness of this Engine which peculiarly qualifies it for locomotive purposes. 6. The small quantity of water used from the air being made an expanding medium for the Caloric, - this also renders it eligible for locomotion.

Charles J. Conway

Witness
David Agur
Thos. Jefferson Smith (Drawing)

2156 [illegible]

Ex.
C.H.W.